(12) United States Patent
Sackmann

(10) Patent No.: US 9,329,604 B2
(45) Date of Patent: May 3, 2016

(54) METHOD FOR CONTROLLING THE TEMPERATURE OF A GLOW PLUG

(71) Applicant: BorgWarner BERU Systems GmbH, Ludwigsburg, DE (US)

(72) Inventor: Martin Sackmann, Benningen, DE (US)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 551 days.

(21) Appl. No.: 13/785,329

(22) Filed: Mar. 5, 2013

(65) Prior Publication Data

US 2013/0238161 A1    Sep. 12, 2013

(30) Foreign Application Priority Data

Mar. 9, 2012  (DE) .......................... 10 2012 102 001
Jun. 20, 2012  (DE) .......................... 10 2012 105 376

(51) Int. Cl.
| | | |
|---|---|---|
| *F02P 19/00* | (2006.01) | |
| *G05D 23/19* | (2006.01) | |
| *F02P 19/02* | (2006.01) | |
| *G05D 23/24* | (2006.01) | |

(52) U.S. Cl.
CPC .............. *G05D 23/19* (2013.01); *F02P 19/025* (2013.01); *G05D 23/2401* (2013.01)

(58) Field of Classification Search
CPC ......... F02P 19/00; F02P 19/02; F02P 19/022; F02P 19/025; G05D 23/19
USPC ........ 123/143 R, 145 A, 145 R, 179.5, 179.6, 123/196 S, 612, 623, 628; 700/32, 33, 42, 700/299, 300; 219/490, 497, 450; 73/114.08, 114.62
See application file for complete search history.

(56) References Cited

U.S. PATENT DOCUMENTS

| | | | | |
|---|---|---|---|---|
| 5,327,870 A * | 7/1994 | Boisvert | .................. | F02P 19/02 123/145 A |
| 6,610,964 B2 | 8/2003 | Radmacher | | |
| 7,631,625 B2 * | 12/2009 | De Pottey | ............ | F02M 31/107 123/179.21 |
| 2003/0019865 A1 * | 1/2003 | Whitney | ............ | G01N 27/4067 219/497 |
| 2004/0255889 A1 * | 12/2004 | Kumada | ................ | F02P 19/025 123/179.6 |
| 2009/0183718 A1 * | 7/2009 | Casasso | ................ | F02P 19/025 123/623 |
| 2009/0194070 A1 * | 8/2009 | Dittus | ..................... | F02B 77/08 123/406.55 |
| 2009/0294431 A1 * | 12/2009 | Sakurai | ................. | F02P 19/025 219/268 |
| 2010/0288747 A1 | 11/2010 | Yamamoto | | |
| 2011/0220073 A1 * | 9/2011 | Sackmann | ............ | F02D 35/023 123/623 |
| 2011/0258990 A1 * | 10/2011 | Tsujimoto | ................. | F01N 9/00 60/286 |
| 2011/0303649 A1 | 12/2011 | Sakurai et al. | | |

FOREIGN PATENT DOCUMENTS

| | | |
|---|---|---|
| DE | 10 2008 035 036 B3 | 4/2010 |
| DE | 10 2009 015 536 A1 | 10/2010 |
| EP | 2 219 414 A1 | 8/2010 |
| EP | 2 395 230 A2 | 12/2011 |

* cited by examiner

*Primary Examiner* — John Kwon
*Assistant Examiner* — Johnny H Hoang
(74) *Attorney, Agent, or Firm* — Bose McKinney & Evans LLP

(57) ABSTRACT

A method for closed-loop control of the surface temperature of a glow plug. A heating current flowing through the glow plug and a voltage applied to the glow plug are measured, and a calculation rule is used, which assigns a value of the surface temperature to a value pair formed of a value of the heating current and a value of the voltage. The calculation rule takes into account the influence of a changing temperature of a feed line of the heating resistor on the relationship between the heating current measured at a given voltage and the surface temperature of the glow plug. Also disclosed is a method for controlling the surface temperature of a glow plug, in which a factor of the control algorithm is calculated by using a correction term, which takes into account the heat dissipation from a glow tip to cooler parts of the glow plug.

17 Claims, No Drawings

METHOD FOR CONTROLLING THE TEMPERATURE OF A GLOW PLUG

RELATED APPLICATIONS

This application claims priority to DE 10 2012 105 376.6, filed Jun. 20, 2012 and DE 10 2012 102 001.9, filed Mar. 9, 2012, both of which are hereby incorporated by reference in their entireties.

BACKGROUND

This disclosure relates to a method for closed-loop control of the surface temperature of a glow plug.

In known methods, the electrical resistance of the glow plug is normally used as a control variable. The electrical resistance is calculated from continuously measured values of the heating current and of the electrical voltage. The electrical resistance is compared with a target value of the resistance, which is established from a predefined target temperature by means of a temperature/resistance characteristic curve. Instead of establishing a target value of the resistance from a target temperature, an actual value of the temperature can of course also be established from an actual value of the resistance and compared with the target temperature. Both approaches of closed-loop control are equivalent and are each based on a calculation rule that assigns a value of the surface temperature to a value pair formed of an actual value of the heating current and an actual value of the voltage.

The quality of the temperature control achieved in this way with known methods is poor, however. This is true in particular for ceramic glow plugs.

SUMMARY

The present invention provides a way in which the surface temperature of a glow plug can be controlled more precisely.

With a method according to this disclosure, it is taken into account that the total resistance of the glow plug may depend considerably on the resistance of the conductor connected to the heating resistor and that the temperature of the conductor inside the glow plug may be subject to strong fluctuations at a given temperature of the heating resistor. The temperature of the conductor parts specifically depends not only on the temperature of the heating resistor, but also on the previous heating process. With glow plugs comprising conductors having a temperature-dependent resistance, it is therefore not easily possible to determine the temperature of the heating resistor from the total resistance.

In a glow plug, the heating resistor heats up first. During this process, heat flows from the heating resistor to adjacent parts of the glow plug, which are initially still cold but are heated with increasing operating time, such that the heat flow becomes smaller. If the heating resistor is kept at a predefined temperature for a sufficiently long period of time, a stationary temperature distribution is ultimately achieved. With a stationary temperature distribution, the local temperatures at the individual sections or parts of the glow plug no longer change. Only once such a stationary temperature distribution is reached does the electrical resistance of the current conducting parts inside the glow plug stop changing. A resistance/temperature characteristic curve, which assigns a surface temperature to a total resistance, is therefore strictly speaking merely valid for a specific temperature distribution. During operation of a glow plug, there is often no a stationary temperature distribution, since the target temperature of the surface has only recently changed or the glow plug has only recently been put into operation.

With a method according to these teachings, the influence of a changing temperature of current conducting parts connected in the glow plug to the heating resistor on the relationship between the heating current measured at a given voltage and the surface temperature of the glow plug is taken into account by a correction term. A surface temperature can thus be assigned with a greater degree of accuracy to a heating current measured at a given voltage. The quality of the temperature control can therefore be improved significantly with a method according to this disclosure.

With a correction term that adapts the relationship between the heating current measured at a given voltage and the surface temperature to a non-stationary temperature distribution in the glow plug, a much more precise temperature control can be achieved since an actual value of the electrical resistance can be linked more precisely with a surface temperature. Instead of always assuming an unchanging relationship between a variable calculated from current and voltage, for example, resistance, and the surface temperature, a method according to this disclosure takes into account that the surface temperature belonging to a pair of current and voltage values also depends on a non-stationary temperature distribution inside the glow plug and therefore on the operating time thereof, that is to say the time passed since the onset of the heating process. The correction term according to this disclosure according to claim 1 thus takes into account the influence of a non-stationary temperature gradient inside the glow plug on the contribution of the resistance of the current conducting parts connected with the heating resistor to the total resistance.

With a method according to this disclosure, it is possible to calculate directly from actual values of current and voltage an actual value of the surface temperature, which is then compared with the target value of the surface temperature. It is equally possible with a method according to this disclosure to calculate from a target value of the surface temperature a target value of a temperature-dependent control variable, for example of the electrical resistance, and to compare this with an actual value of the control variable, which is calculated from actual values of current and voltage. In both cases, a calculation rule is used that assigns a value of the surface temperature to a value pair formed of a value of the heating current and a value of the electrical voltage.

With the first option, the correction term is used in the calculation of the actual value of the surface temperature from measured values of the heating current and electrical voltage. With the second option, the correction term is used in the calculation of the target value of the control variable from the target value of the surface temperature, for example in the calculation of a target value of the electrical resistance from the target value of the surface temperature. In each case, the influence of a temperature gradient, which changes during operation, in the glow plug on the relationship between the heating current measured at a given voltage and the surface temperature of the glow plug is taken into account. Thus the dependence of resistance on operating time is taken into account.

For the present disclosure, operating time is to be understood to mean the prior period of time during which the glow plug has been heated, that is to say the time since the start of a heating process.

With the correction term of a method according to this disclosure, a characteristic curve demonstrating the relationship between the surface temperature and a value pair containing a current value and a voltage value is thus adapted to a momentary temperature of the conductor that leads in the glow plug to the heating resistor. In other words, the correction term of the method according to this disclosure indicates the extent to which a non-stationary temperature distribution in the glow plug influences the resistance of the supply conductor of the heating resistor. The value pair formed of the current value and voltage value can be represented for example by a value of the electrical resistance or conductivity, and therefore the characteristic curve is then a resistance/temperature characteristic curve or a conductivity/temperature curve, respectively.

If the electrical resistance is used as a control variable for a method according to this disclosure, the correction term can indicate for example the extent to which the electrical resistance of the conductors momentarily deviates from a stationary value. A stationary value is a value that is measured under stationary conditions, that is to say when a stationary temperature distribution is present in the glow plug, that is to say the temperature gradient in the glow plug is constant over time.

Another aspect of this disclosure refers to a method in which a factor of the control algorithm used to calculate the duty cycle is calculated by means of a correction term, which takes into account the heat dissipation from the heating resistor to cooler parts of the glow plug, in particular the heat dissipation in the axial direction of the glow plug.

The steeper the temperature gradient in the glow plug, the greater the heat dissipation from the heating resistor. With increasing operating time after a heating process, the temperature gradient and therefore the heat dissipation reduces until a stationary temperature distribution is reached. The temperature control can therefore be improved by taking into account the temperature dissipation changing over time. This occurs by adapting a factor of the control algorithm to the changing heat dissipation, for example by adding a correction term, which characterises the heat dissipation from the heating resistor to cooler parts of the glow plug, to a factor of the control algorithm.

In a closed-loop control method, a duty cycle of the pulse-width modulation can be calculated from a deviation by means of a control algorithm. The deviation is in this case the difference between a target value and an actual value, for example between a target value of the surface temperature and an actual value of the surface temperature or between a target value of the electrical resistance and an actual value of the electrical resistance.

For example, the control algorithm may have a proportional factor and/or an integral factor. The value of the proportional factor and/or an integral factor may be calculated using a correction term, which takes into account the heat dissipation from the heating resistor to cooler parts of the glow plug. Alternatively or in addition, the control algorithm may contain a differential factor, of which the value is calculated by means of a correction term, which takes into account the heat dissipation from the heating resistor to cooler parts of the glow plug. The control algorithm may be a proportional-integral control system (PI system) for example, in particular a proportional-integral differential control system (PID system). For example, it is also possible for the control algorithm to be a pure proportional control system or a state control system.

The deviation of the actual value from the target value is also called error. A proportional factor of a control algorithm is multiplied with the error. An integral factor of a control algorithm is multiplied with an integral of the error over a time period. A differential factor of a control algorithm is multiplied with the time derivative of the error. The response of a control algorithm is defined by the sum of any of the above factors that are used in the control algorithm.

With a control method according to one embodiment, the control response for a given deviation depends on the strength of the heat dissipation from the heating resistor, that is to say the extent to which the temperature gradient in the glow plug differs from a stationary temperature distribution. When there is stronger heat dissipation, there is a stronger control response to a given deviation, for example by using a greater proportional factor for the control algorithm.

With a method according to this embodiment, the correction term may characterise the heat flow in the radial direction for example. However, the heat flow in the axial direction in the glow plug is generally more significant, in particular at the start of a heating process. Rear portions of the glow plug facing away from the glow tip are a very large heat sink. By taking into account a temperature gradient changing in the axial direction when determining one or more factors of a control algorithm, the temperature control can therefore be improved considerably. The correction term preferably characterises the heat dissipation in the axial direction of the glow plug.

In particular with glow plugs that contain conductors having a resistance that is not dependent, or is only slightly dependent, on temperature, an improved temperature control can also be implemented with a method according to claim 14, even without the measures of a method according to claim 1.

A method according to claim 14 can also be combined however with a method according to claim 1, wherein the same correction term can be used to correct the calculation rule that assigns a value of the surface temperature to a value pair formed of a value of the heating current and a value of the voltage and also to adapt a factor of the closed-loop control algorithm. It is also possible to use different correction terms for this.

DETAILED DESCRIPTION

The embodiments described below are not intended to be exhaustive or to limit this disclosure to the precise forms disclosed in the following detailed description. Rather, the embodiments are chosen and described so that others skilled in the art may appreciate and understand the principles and practices of the present invention.

This disclosure can be used particularly advantageously for externally heating glow plugs. Externally heating glow plugs have an outer resistance layer as a heating resistor and are known for example from DE 10 2008 035 036 B3 and U.S. Pat. No. 6,610,964 B2. Changes to the temperature of the heating resistor have a direct effect on the surface temperature of the glow plug in the case of externally heating glow plugs. In contrast to internally heating glow plugs, of which the heating resistor is a filament arranged inside the glow pin, externally heating glow plugs can therefore be brought more quickly to a desired surface temperature.

In externally heating glow plugs, in particular ceramic externally heating glow plugs, the proportion of the resistance of conductors contributing to the total resistance of the glow plug is not negligible. The conductor connected to the externally arranged heating resistor of such a glow plug is a ceramic inner conductor, which is surrounded by an insulator layer, on which the heating conductor is arranged. With glow plugs of this type, the surface temperature of the glow plug may typically deviate by up to 100 K from the temperature of the inner conductor. With increasing operating time of the glow plug, the temperature of the inner conductor gradually approaches the temperature of the heating conductor and therefore also the surface temperature. This causes the current and voltage values belonging to a given surface temperature to change over time. In accordance with this disclosure, this is taken into account by a correction term and the control process is thus improved. Here, both a radial heat flow from the outside in and also an axial heat flow from the glow tip to plug regions arranged further behind can be taken into account.

The correction term of an exemplary method indicates how the temperature of the current conducting parts inside the glow plug and therefore the electrical resistance thereof changes over time with constant surface temperature and how this affects the relationship between a value pair, which contains a current value and an associated voltage value, and the surface temperature. A simple and effective approximation for the way in which the resistance of the conducting parts changes following a change of the surface temperature to a target value is to change a starting value proportionally to time and, after a predefined period of time or after the supply of a predefined heat energy, use a constant value. After a sufficiently long time, a stable temperature distribution inside the glow is established for the surface temperature in question. Then the temperature of the conductors no longer changes and the resistance of the conductors remains constant.

In accordance with an advantageous embodiment, the correction term initially changes linearly over time and then reaches a predefined saturation value. If a characteristic curve of a glow plug which is heated right through and of which the internal temperature distribution is stable is to be adapted with the correction term, the saturation value may be zero, that is to say the correction term may disappear. Conversely, a characteristic curve of a glow plug which has only just been put into operation and in which a maximum temperature gradient is present can also be adapted with a correction term. In this case, the correction term at the start is zero and the saturation value is different from zero.

For example, the correction term k for the first scenario can be defined as follows: $k=a-bt$, for $t \leq a/b$, and $k=0$ for $t>a/b$. For the second scenario, that is to say the adaptation of a characteristic curve of a glow plug only just put into operation and having a changing temperature gradient, the correction term k can be defined as follows: $k=bt$, for $t \leq a/b$, and $k=a$ for $t>a/b$. In both cases, a and b are constants, which for example are determined empirically for a series of glow plugs and can be provided in a glow plug control device. The calculation rule that assigns a value of the surface temperature to a value pair formed of a value of the heating current and a value of the voltage can be adapted for example by adding such a correction term to a non-stationary temperature distribution. The same is true for a factor of a control algorithm that can be adapted by adding such a correction term to a non-stationary temperature distribution and can thus take into account the heat dissipation from the heating resistor to cooler parts of the glow plug. However, it is also possible to carry out an adaptation by different means, for example by multiplication with a correction term.

Series of glow plugs are sometimes also referred to as types or models. A series is to be understood to mean glow plugs that differ from one another merely by deviations within production tolerances. Ideally, all glow plugs of a series should thus match in terms of all properties and dimensions. Manufacturing tolerances are unavoidable however, which is why glow plugs of a given series differ within the scope of manufacturing tolerances.

An upper limit and a lower limit are preferably predefined for the correction term so that the value of the correction term always lies within the value range defined by the upper and lower limit. In accordance with an advantageous refinement, the value of the target value monotonously approaches one of the two limits in the event of a change to the target value of the surface temperature. For example, the target value may fall monotonously until the lower limit is reached, or alternatively may rise monotonously until the upper limit is reached.

The correction term can also be a complicated function of time, for example it may depend on time exponentially or in another non-linear manner or it may depend on a time integral over the supplied power. A significant improvement of the temperature control can already be achieved however if the correction term rises linearly with time, initially and/or after a preheating phase, in which the glow plug is heated to start an engine, and then reaches a saturation value, that is to say after a sufficiently long operating time. A simple possibility for calculating the correction term lies in predefining an upper and lower limit for the correction term and then assigning the correction term a value that can be established by multiplying a constant and the operating period, as long as the value thus calculated lies within the predefined limits. If the value thus calculated reaches or exceeds the upper limit, the maximum value, that is to say the value of the upper limit, is assigned to the correction term. The proportionality constant used therein can be predefined by the producer for a series of glow plugs. For example, the energy supplied to the glow plug can also be used instead of time with such a calculation rule.

The correction term can also be calculated from a time derivative of the electrical resistance. If the time derivative of the electrical resistance is zero, this means that stationary conditions are present. The magnitude of the time derivative can therefore be used as a measure for the extent to which the momentary electrical resistance of the feed lines, running in the glow plug, of the heating resistor deviates from its value under stationary conditions.

The calculation rule for the correction term can be established for a series of glow plugs by way of experiment or for example also by simulation calculations. The correction term can be calculated as a function that is dependent explicitly only on time. It is also possible however for the correction term to be dependent additionally on other parameters, for example the cylinder head temperature or the cooling water temperature or engine parameters such as rotational speed or load.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A method for closed-loop control of the surface temperature of a glow plug, which is heated by a pulse-width modulation method, to a target value of the surface temperature, comprising:
measuring a heating current flowing through a heating resistor of the glow plug and a voltage applied to the glow plug; and
using a calculation rule which assigns a value of the surface temperature to a value pair formed of a value of the heating current and a value of the voltage,
wherein
the calculation rule contains a correction term, which takes into account the influence of a changing temperature of a current conducting component of the glow plug, contained in the glow plug and connected to the heating resistor, on the relationship between the heating current measured at a given voltage and the surface temperature of the glow plug.

2. The method according to claim 1, wherein:
an actual value of a control variable is established from measured values of the heating current and the electrical voltage;
the correction term is used to calculate a target value of the control variable from the target value of the surface temperature; and
the actual value of the control variable is compared with the target value of the control variable and the duty cycle of the pulse-width modulation is changed to minimize a deviation found by this comparison.

3. The method according to claim 2, wherein the control variable is the electrical resistance.

4. The method according to claim 1, wherein:
the correction term is used to calculate an actual value of the surface temperature from measured values of the heating current and the electrical voltage; and
the actual value of the surface temperature is compared with the target value of the surface temperature and the duty cycle of the pulse-width modulation is changed to minimize a deviation found by this comparison.

5. The method according to claim 1, wherein an upper limit and a lower limit are predefined for the correction term.

6. The method according to claim 5, wherein in the event of a change of the target value of the surface temperature starting from one of the two limits, the value of the correction term starts from one of the limits and monotonously approaches the other limit.

7. The method according to claim 1, wherein the correction term is calculated as a function of time.

8. The method according to claim 1, wherein the correction term is calculated as a function of the heat energy fed since the start of the heating process.

9. The method according to claim 1, wherein the correction term initially changes linearly with time and then reaches a predefined saturation value.

10. The method according to claim 1, wherein the correction term is calculated as a function of cooling water temperature.

11. The method according to claim 1, wherein the correction term is calculated as a function of cylinder head temperature.

12. The method according to claim 1, wherein the correction term is calculated from a time derivative of the resistance.

13. The method according to claim 1, wherein the duty cycle is changed as a function of the correction term.

14. A method for closed-loop control of the surface temperature of a glow plug, which is heated by a pulse-width modulation method, to a target value of the surface temperature, comprising:
measuring a heating current flowing through a heating resistor of the glow plug and a voltage applied to the glow plug;
using a calculation rule which assigns a value of the surface temperature to a value pair formed of a value of the heating current and a value of the voltage; and
calculating a duty cycle of the pulse-width modulation method by means of a control algorithm,
wherein
a factor of the control algorithm is calculated by means of a correction term, which takes into account the heat dissipation from the heating resistor to cooler components of the glow plug.

15. The method according to claim 14, wherein the factor is a proportional factor of the control algorithm.

16. The method according to claim 14, wherein the factor is an integral factor of the control algorithm.

17. The method according to claim 14, wherein the correction term takes into account the heat dissipation in the axial direction of the glow plug.

* * * * *